UNITED STATES PATENT OFFICE.

RUDOLPH BERENDES AND FELIX HERWIG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

OXYALKYL DERIVATIVE OF THE XANTHIN BASES.

No. 874,825.    Specification of Letters Patent.    Patented Dec. 24, 1907.

Application filed June 25, 1907. Serial No. 380,783.

*To all whom it may concern:*

Be it known that we, RUDOLPH BERENDES and FELIX HERWIG, doctors of philosophy, chemists, citizens of the German Empire, residing at Elberfeld, Kingdom of Prussia, Germany, have invented new and useful Improvements in New Oxyalkyl Derivatives of the Xanthin Bases, of which the following is a specification.

The xanthin bases, such as xanthin, theophyllin, theobromin, methyl-xanthin, etc., suffer in respect of their use in medicine from the disadvantage of being only slightly soluble in water and of producing when taken internally toxic symptoms.

We have been successful in preparing the hitherto unknown oxyalkyl-derivatives of these bases and have found that these compounds are easily soluble in water. They act chemically like alcohols and form esters with acid chlorids, such as acetyl chlorid. By the action of chlor-formic acid ester and subsequent treatment with ammonia urethanes are formed. They are free from any toxic by-effects while the diuretic action of the xanthin bases used for their preparation is not altered in the new compounds. They are to be be prescribed or taken in similar doses as the materials from which they are prepared.

The process for producing the new compounds consists in treating xanthin bases containing free hydrogens in the imino groups, or their salts, with halogen hydrins, such as glycol chlorhydrin

glycol bromhydrin, glycol iodohydrin, alpha chlorhydrin $CH_2.OH - CH(OH) - CH_2.Cl$, alpha bromhydrin alpha iodohydrin etc. It is advantageous to carry out the reaction in the presence of agents capable of binding acids.

In order to illustrate our invention we give the following example, the parts being by weight: 180 parts of theophyllin (1.3-dimethylxanthin) and 40 parts of NaOH are dissolved in water; 80½ parts of glycolchlorhydrin are added and the mixture is then heated to 100–120° for some hours. The water is removed from the product of the reaction by evaporation and the residue is extracted with boiling alcohol which dissolves the 1.3-dimethyl-7-oxy-ethyl-xanthin. It crystallizes from this solution in the shape of beautiful colorless leaflets melting at 158 to 160° C. It is easily soluble in water, soluble with more difficulty in alcohol and scarcely soluble in ether and benzene and has the formula:

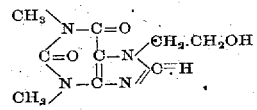

Its formation probably takes place according to the following formula:

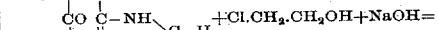
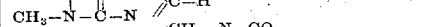

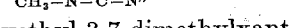

The 1-oxyethyl-3.7-dimethylxanthin obtainable from glycolchlorhydrin or glycolbromhydrin and theobromin melts at 189–191° C. and forms needles easily soluble in water.

The 1 di-oxypropyl-3.7-dimethylxanthin obtainable from the bromin and alpha-chlorhydrin has the melting point: 153 to 155° C. and forms colorless needles easily soluble in water.

The 1.7-di-oxyethyl-3-methylxanthin obtainable from one molecule of 3-methylxanthin and two molecules of glycolchlorhydrin forms colorless needles melting at 168 to 170° C. It is easily soluble in water and has the formula:

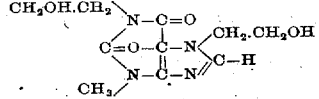

The process is carried out in an analogous manner if instead of the above mentioned xanthin bases or salts thereof other xanthin bases containing free iminohydrogens or if instead of the above mentioned halogen hydrins other halogen hydrins are used.

Having now described our invention and in what manner the same is to be performed, what we claim as new and desire to secure by Letters Patent is:—

1. The herein described new oxyalkyl derivates of xanthin bases obtainable by treating xanthin bases containing replaceable hydrogen in the imino groups, with halogen hydrins with the addition of agents capable of binding acids, and being crystalline compounds easily soluble in water acting like alcohols, forming esters with acid chlorids, and by the action of chlor-formic acid ester and subsequent treatment with ammonia being converted into urethanes; and exhibiting valuable therapeutic properties, substantially as hereinbefore described.

2. The herein described 1.3-dimethyl-oxyethylxanthin obtainable by treating theophyllin with glycolchlorhydrin, and crystallizing from alcohol in the shape of colorless leaflets melting at 158–160° C., being easily soluble in water more difficultly soluble in alcohol, scarcely soluble in ether and benzene, acting like an alcohol, forming esters with acid chlorids, and by the action of chlor-formic acid ester and subsequent treatment with ammonia being converted into the corresponding urethane; and exhibiting valuable therapeutic properties, substantially as hereinbefore described.

In testimony whereof we have here .to set our hands in the presence of two subscribing witnesses.

RUDOLPH BERENDES. [L. S.]
FELIX HERWIG. [L. S.]

Witnesses:
OTTO KÖNIG,
WILHELM FRIEDERICHS.

---

Corrections in Letters Patent No. 874,825.

It is hereby certified that in Letters Patent No. 874,825, granted December 24, 1907, upon the application of Rudolph Berendes and Felix Herwig, of Elberfeld, Germany, for an improvement in "Oxyalkyl Derivatives of the Xanthin Bases," errors appear in the printed specification requiring correction, as follows: In line 28, page 1, the word "be" should be stricken out; in line 65, same page, on the right side of the formula the sign "$>C=H$" should read $>C.—H$, and in line 82, same page, the words "the bromin" should read *theobromin;* and that the said Letters Patent should be read with these corrections therein that the same may conform to the record of the case in the Patent Office.

Signed and sealed this 11th day of February, A. D., 1908.

[SEAL.]

C. C. BILLINGS,
*Acting Commissioner of Patents.* what we claim as new and desire to secure by Letters Patent is:—

1. The herein described new oxyalkyl derivates of xanthin bases obtainable by treating xanthin bases containing replaceable hydrogen in the imino groups, with halogen hydrins with the addition of agents capable of binding acids, and being crystalline compounds easily soluble in water acting like alcohols, forming esters with acid chlorids, and by the action of chlor-formic acid ester and subsequent treatment with ammonia being converted into urethanes; and exhibiting valuable therapeutic properties, substantially as hereinbefore described.

2. The herein described 1.3-dimethyl-oxyethylxanthin obtainable by treating theophyllin with glycolchlorhydrin, and crystallizing from alcohol in the shape of colorless leaflets melting at 158–160° C., being easily soluble in water more difficultly soluble in alcohol, scarcely soluble in ether and benzene, acting like an alcohol, forming esters with acid chlorids, and by the action of chlor-formic acid ester and subsequent treatment with ammonia being converted into the corresponding urethane; and exhibiting valuable therapeutic properties, substantially as hereinbefore described.

In testimony whereof we have here to set our hands in the presence of two subscribing witnesses.

RUDOLPH BERENDES. [L. S.]
FELIX HERWIG. [L. S.]

Witnesses:
OTTO KÖNIG,
WILHELM FRIEDERICHS.

---

Corrections in Letters Patent No. 874,825.

It is hereby certified that in Letters Patent No. 874,825, granted December 24, 1907, upon the application of Rudolph Berendes and Felix Herwig, of Elberfeld, Germany, for an improvement in "Oxyalkyl Derivatives of the Xanthin Bases," errors appear in the printed specification requiring correction, as follows: In line 28, page 1, the word "be" should be stricken out; in line 65, same page, on the right side of the formula the sign "$>C=H$" should read $>C.-H$, and in line 82, same page, the words "the bromin" should read *theobromin;* and that the said Letters Patent should be read with these corrections therein that the same may conform to the record of the case in the Patent Office.

Signed and sealed this 11th day of February, A. D., 1908.

[SEAL.]

C. C. BILLINGS,
*Acting Commissioner of Patents.*

It is hereby certified that in Letters Patent No. 874,825, granted December 24, 1907, upon the application of Rudolph Berendes and Felix Herwig, of Elberfeld, Germany, for an improvement in "Oxyalkyl Derivatives of the Xanthin Bases," errors appear in the printed specification requiring correction, as follows: In line 28, page 1, the word "be" should be stricken out; in line 65, same page, on the right side of the formula the sign "$>C=H$" should read $>C-H$, and in line 82, same page, the words "the bromin" should read *theobromin;* and that the said Letters Patent should be read with these corrections therein that the same may conform to the record of the case in the Patent Office.

Signed and sealed this 11th day of February, A. D., 1908.

[SEAL.]

C. C. BILLINGS,
*Acting Commissioner of Patents.*